(12) United States Patent
Fang

(10) Patent No.: US 6,687,027 B1
(45) Date of Patent: Feb. 3, 2004

(54) PARALLEL DRIVING MECHANISM FOR OPTICAL CHASSIS

(75) Inventor: Po-Hua Fang, Taipei (TW)

(73) Assignee: Umax Data Systems (TW)

( * ) Notice: Subject to any disclaimer, the term of this patent is extended or adjusted under 35 U.S.C. 154(b) by 620 days.

(21) Appl. No.: 09/697,197

(22) Filed: Oct. 26, 2000

(51) Int. Cl.[7] .............................................. H04N 1/04
(52) U.S. Cl. ..................... 358/497; 358/474; 358/471
(58) Field of Search ................................ 358/497, 494, 358/474, 471, 400, 505, 500, 506, 487, 473, 483; 382/312; 399/211; 318/685, 696; 250/208.1, 234–236

(56) References Cited

U.S. PATENT DOCUMENTS

| | | | | |
|---|---|---|---|---|
| 4,870,502 A | * | 9/1989 | Dreinhoff et al. | 358/474 |
| 5,691,825 A | * | 11/1997 | Fujiwara | 358/497 |
| 5,734,483 A | * | 3/1998 | Itoh | 358/497 |
| 5,781,313 A | * | 7/1998 | Nose et al. | 358/497 |
| 5,900,951 A | * | 5/1999 | Tsai | 358/497 |
| 5,999,277 A | * | 12/1999 | Tsai | 358/497 |
| 6,005,685 A | * | 12/1999 | Tsai | 358/497 |
| 6,091,517 A | * | 7/2000 | Hayashi | 358/497 |
| 6,108,108 A | * | 8/2000 | Peng | 358/497 |
| 6,266,164 B1 | * | 7/2001 | Chiang | 358/497 |
| 6,285,441 B1 | * | 9/2001 | Takahara | 358/474 |
| 6,381,041 B1 | * | 4/2002 | Hayashi et al. | 358/474 |
| 6,535,305 B1 | * | 3/2003 | Chang et al. | 358/497 |

* cited by examiner

Primary Examiner—Cheukfan Lee

(57) ABSTRACT

A parallel driving mechanism for an optical chassis in a scanner includes a casing, an optical chassis, a linkage member, a screw bar and a driving member. The casing has two parallel guide rails. The optical chassis has two rollers at two ends movably resting on the guide rails and two pivotal joints. The linkage member has two symmetrical upper links pivotally engaging with two symmetrical lower links on two sleeves which have opposite internal screw threads formed therein. The driving member may rotate the screw bar which moves the sleeves to move toward or against each other so that the upper and lower links may be extended or withdrawn to more the optical chassis moving reciprocally on the guide rails to perform scanning operation.

6 Claims, 4 Drawing Sheets

PARALLEL DRIVING MECHANISM FOR OPTICAL CHASSIS

FIELD OF THE INVENTION

This invention relates to an optical chassis for scanner and particularly to a parallel driving mechanism for the optical chassis to move parallelly during scanning operation.

BACKGROUND OF THE INVENTION

Scanner is a widely used computer peripheral device that uses an optical chassis for housing the mirrors, lamp, lens set and CCD to scan a document for capturing and converting document image into digital signals for computer process.

FIG. 1 shows a typical conventional scanner optical apparatus which includes a casing 10, an optical chassis 20 and a transmission means 301. The casing 10 is hollow and includes four side walls 12 and a bottom wall 14. In the casing 10, there is a guide rail 16 at one side and a guide rod 18 located parallelly at another side for providing linear moving path to the optical chassis 20.

The optical chassis 20 is mounted with a lamp, several mirrors, a lens set and a charge coupled device (CCD, not shown in the figure) for capturing document image.

The optical chassis 20 further has a roller 22 movable on the guide rail 16, a guide bore 24 slidably holds the guide rod 18 and a clamp 26 located at one end thereof.

The transmission means 30 includes a motor 32 and a belt 34 engaged with the clamp 26. When the motor 30 rotates and drives the belt 34, the optical chassis 20 will be moved reciprocally along the guide rail 16 and guide rod 18 to perform scanning operation.

As the clamp 26 is located at one end of the optical chassis 20, when the moving belt 34 drags the optical chassis 20 through the clamp 26 to move along the guide rail 16 and guide rod 18, a torque will incur to optical chassis 20 and result in skew position. The friction between the guide bore 24 and guide rod 18 will increase. The motion might become rough and tremble between the guide bore 24 and guide rod 18, and between the roller 22 and guide rail 16. All this may have negative impact on scanning quality.

Since the optical chassis 20 is not a homogenous member, its center gravity is difficult to locate precisely. It is therefore difficult to locate a precise dragging point for the clamp. Furthermore, the guide rail 16 and guide rod 18 have different friction coefficient against the roller 22 and guide bore 24, the friction unbalance between the two cannot be totally eliminated. Hence the motion of the optical chassis 20 during scanning operation cannot always be as smooth as desired, which unavoidably impacts scanning quality. There is still room for improvement in the driving mechanism for optical chassis in the scanner.

SUMMARY OF THE INVENTION

It is an object of this invention to provide a parallel driving mechanism for scanner that will move the optical chassis horizontally and steadily during scanning operation for obtaining improved scanning quality.

The parallel driving mechanism according to this invention includes a casing, an optical chassis, a linkage member, a screw bar and a driving member.

The casing is hollow and rectangular, and has four side walls and a bottom wall. On one side wall, there is a pair of symmetrical pivotal joints. On the bottom wall, there is a pair of parallel guide rails. The optical chassis has two rollers mounted at two ends for supporting and moving the optical chassis on the guide rails and a pair of symmetrical pivotal joints located on a side wall there of. The linkage member has a pair of upper links pivotally engaged with a pair of lower links at one end thereof. Another ends of the upper and lower links engaged respectively with the pivotal joints at the side wall of the casing and optical chassis. The pivotal engaging joints of the upper and lower links are located respectively on a sleeve which has opposite internal screw threads. The screw bar engaged with the two sleeves and has one end engaged with the driving member. When the driving member rotates the screw bar, the two sleeves will be turned in opposite direction, thus will extend or withdraw the upper and lower links simultaneously. Consequently the optical chassis will be pushed or pulled at the two pivotal joints at the aide wall thereof for moving the optical chassis smoothly and steadily along the guide rails for scanning operation.

BRIEF DESCRIPTION OF DRAWINGS

The invention, as well as its many advantages, may be further understood by the following detailed description and drawings in which.

DETAILED DESCRIPTION OF THE PREFERRED EMBODIMENT

Figure 2:
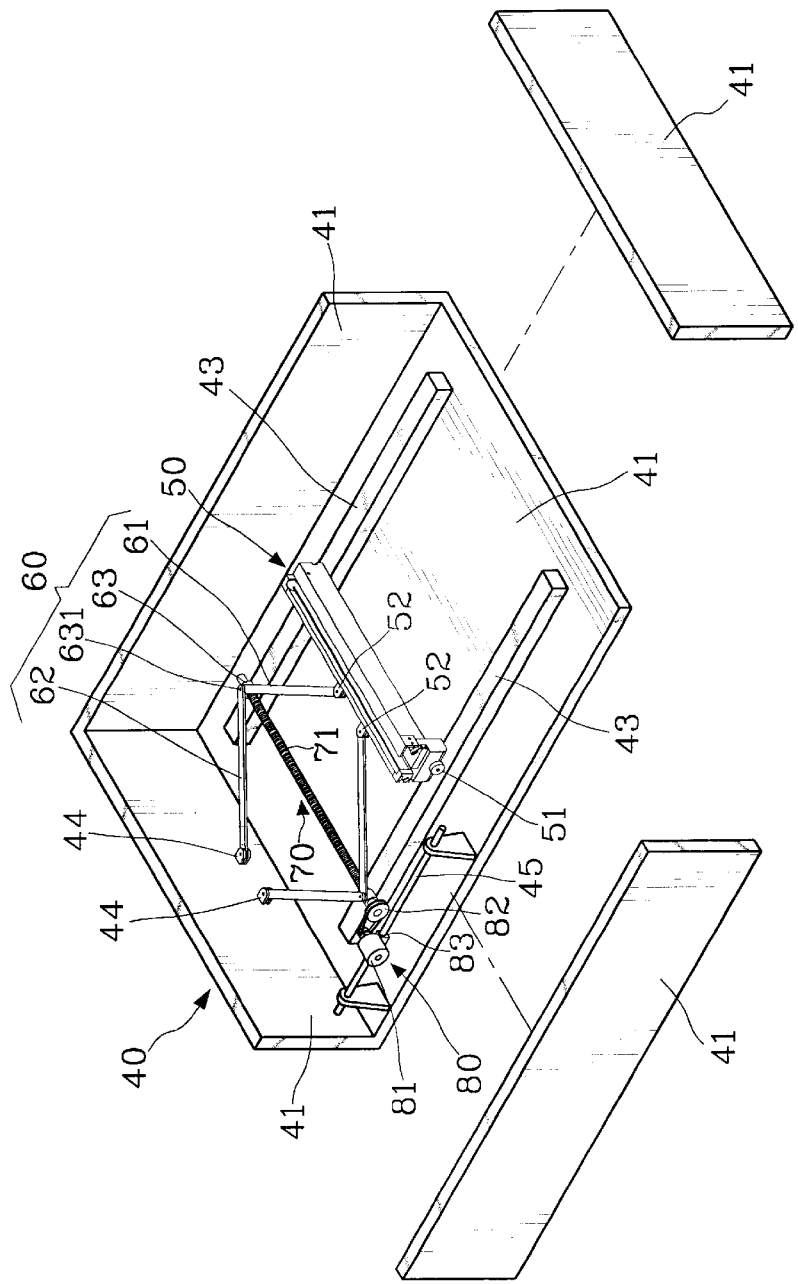
FIG. 2 is a perspective exploder view of this invention.

Referring to FIG. 2, this invention includes a casing 40, an optical chassis 50, a linkage member 60, a screw bar 70 and a driving member 80.

The casing 40 is hollow and rectangular, and includes four side walls 41 and a bottom wall 42 upon which two parallel guide rails 43 are provided. On one side wall 41, there are a pair of symmetrical pivotal joints 44.

The optical chassis 50 includes a light source, a reflection mirror means, a lens and a CCD (not shown in the figure). At two ends of the optical chassis 50, there are mounted respectively a roller 51 movably resting on the guide rails 43. At one side wall of the optical chassis, there are another pair of symmetrical pivotal joints 52 located thereon.

The linkage member 60 includes a pair of symmetrical upper links 61, a pair of symmetrical lower links 62 and two sleeves 63 which have opposite internal screw threads formed therein. The upper links 61 have respectively one end pivotally engaged with one end of the lower links 62 on the sleeves 63. Another end of the upper and lower links engage respectively with the pivotal joints 44 and 52.

The screw bar 70 has external screw threads engageable with the internal threads of the sleeves 63 which are symmetrically mounted on the screw bar 70. In order to drive the two sleeves 63 symmetrically, the screw bar 70 is formed with two different formats (i.e., different screwing directions) of external screw threads for mounting the two sleeves 63 respectively.

The driving member 80 includes a motor 81 and a gear set 82 engaged with one end of the screw bar 70. The driving member 80 further has a guide bore 83 slidably holding a guide rod 45 parallel with the guide rail 43.

When in use, the motor 81 drives the gear set 82 which rotates at a reducing speed to turn the screw bar 70.

Figure 1:
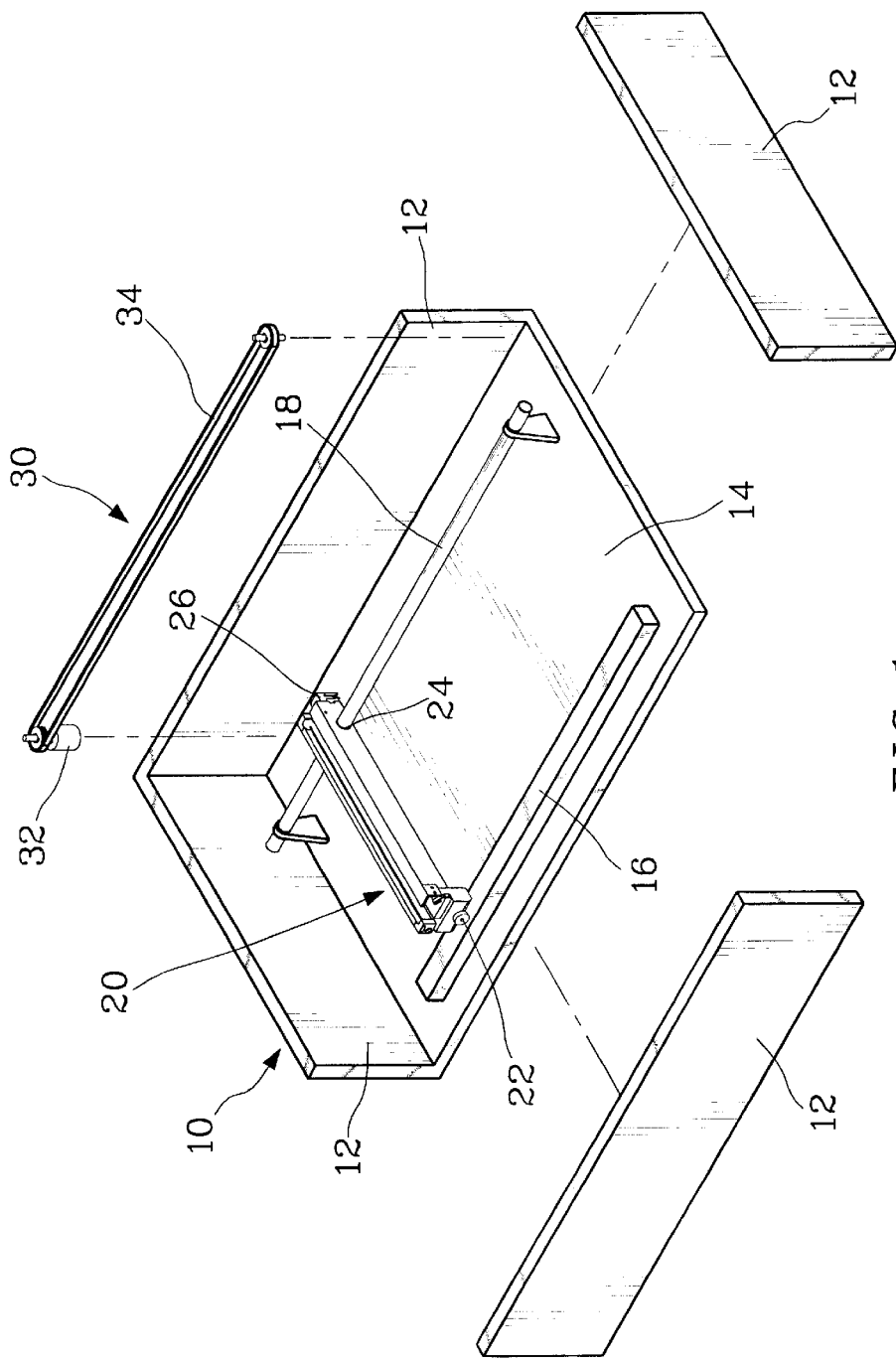
FIG. 1 is a perspective exploded view of a conventional scanner optical chassis.
Figure 3A:
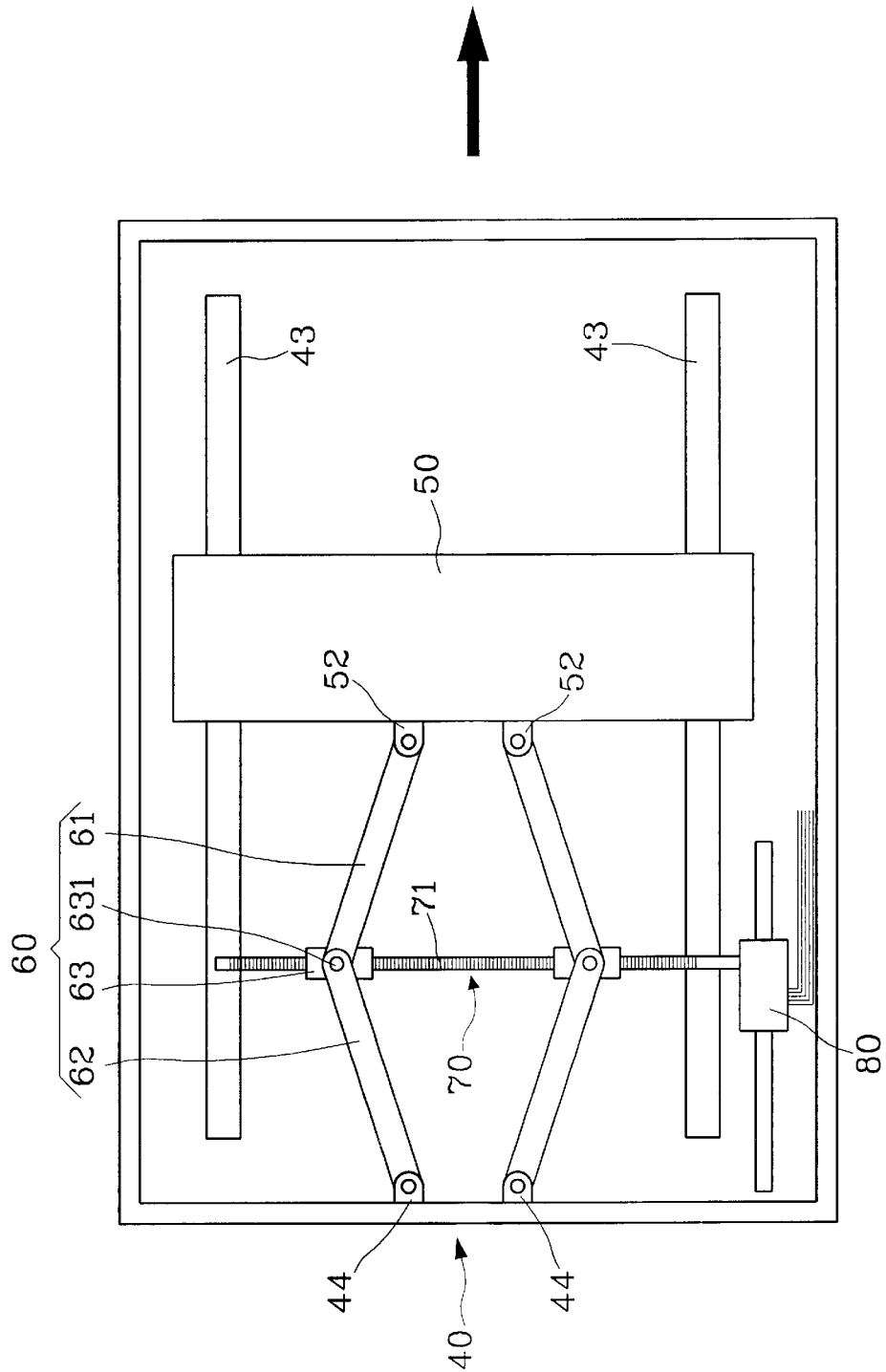
FIGS. 3A & 3B are top views of this invention in use.
Figure 3B:
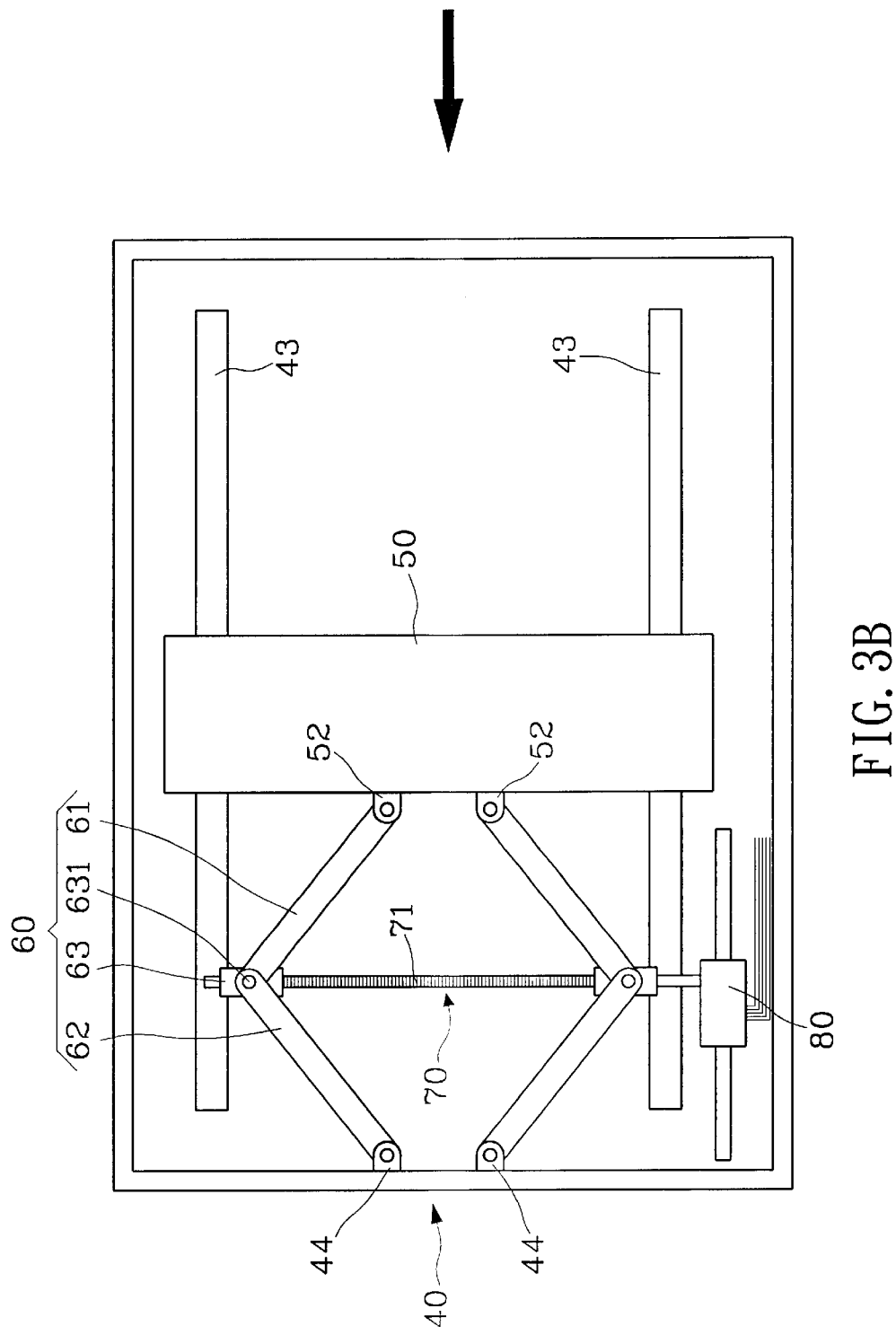

The rotating screw bar 70 moves the sleeves 63 toward each other (FIG. 3A) with the upper and lower links 61 and 62 extending and stretching to push the optical chassis 50 to one side of the casing remote from the pivotal joints 44. When the motor 81 is driven to rotated in opposite direction the sleeves 63 will be moved sideward away from each other. Then the upper and lower links 61 and 62 will be withdrawn toward each other (FIG. 3B). The optical chassis 50 will be pulled toward the side where the pivotal joints 44 are located. This pull and push movement enables the optical chassis 50 to perform scanning operation. As this reciprocal motion of the optical chassis 50 is done through actuating two pairs of symmetrical links 61 and 62 which are anchored at two pair of symmetrical pivotal joints 44 and 52, the movement of the optical chassis 50 may be made steady and smooth over guide rails without the skewing or trembling that might otherwise happen to the conventional scanner in which the optical chassis is being dragged at one end as shown in FIG. 1. During the scanning operation, the motor 81 may also be moved synchronously with the optical chassis along the guide rod 45.

In summary, this invention offers the following advantages over conventional one:

1. The linkage member may move the optical chassis smoothly and parallelly without skewing.
2. The turning of the screw bar may drive the optical chassis to move at steady speed without intermittent or trembling phenomenon that might otherwise happen to the conventional scarcer.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope the invention.

What is claimed is:

1. A parallel driving mechanism for optical chassis, comprising;
    a rectangular and hollow casing including four side walls and a bottom wall upon which two parallel guide rails are located, one of the side walls having two symmetrical first pivotal joints located thereon;
    an optical chassis reciprocally movable in the casing for scanning operation having two rollers located at two ends and two symmetrical second pivotal joints located on a side wall thereof;
    a linkage member having two symmetrical upper links pivotally engageable at one end thereof with one end of two symmetrical lower links on two sleeves which have opposite internal screw threads formed therein, the upper and lower links have respectively another ends pivotally engageable with the first and second pivotal joints;
    a screw bar having two opposite external screw threads engageable with the two sleeves respectively; and
    a driving member engageable with one end of the screw bar for moving the sleeves to and fro to drive the linkage member for moving the optical chassis reciprocally in the casing.

2. The parallel driving mechanism of claim 1, wherein the upper and lower links have same length.

3. The parallel driving mechanism of claim 1, wherein the upper and lower links have different lengths.

4. The parallel driving mechanism of claim 1, wherein the driving member includes a motor for generating output power and a gear set for transmitting output power to the screw bar.

5. The parallel driving mechanism of claim 4, wherein the casing further has a guide rod parallel to moving direction of the optical chassis for slidably engaging with a guide bore in the driving member for the same to move with the optical chassis reciprocally driving scanning operation.

6. The parallel driving mechanism of claim 1, wherein the optical chassis includes a scanning light source, a reflection mirror set, a lens set and a charged couple device.

* * * * *